United States Patent
Kondo et al.

(10) Patent No.: US 9,580,940 B2
(45) Date of Patent: Feb. 28, 2017

(54) VEHICLE COVER OPENING AND CLOSING CONTROL DEVICE

(71) Applicant: JOHNAN MANUFACTURING INC., Nagano (JP)

(72) Inventors: Tsuyoshi Kondo, Nagano (JP); Hideaki Takehara, Nagano (JP); Masakane Yoshizawa, Nagano (JP); Shun Sakurai, Ueda (JP)

(73) Assignee: JOHNAN MANUFACTURING INC., Nagano (JP)

( * ) Notice: Subject to any disclaimer, the term of this patent is extended or adjusted under 35 U.S.C. 154(b) by 0 days.

(21) Appl. No.: 14/891,181

(22) PCT Filed: Dec. 9, 2013

(86) PCT No.: PCT/JP2013/082956
§ 371 (c)(1),
(2) Date: Nov. 13, 2015

(87) PCT Pub. No.: WO2014/184980
PCT Pub. Date: Nov. 20, 2014

(65) Prior Publication Data
US 2016/0083981 A1    Mar. 24, 2016

(30) Foreign Application Priority Data
May 15, 2013 (JP) .................... 2013-103411

(51) Int. Cl.
*E05B 81/00* (2014.01)
*B60K 1/04* (2006.01)
(Continued)

(52) U.S. Cl.
CPC ............... *E05B 81/01* (2013.01); *B60K 1/04* (2013.01); *B60L 3/00* (2013.01); *B60L 11/1818* (2013.01);
(Continued)

(58) Field of Classification Search
CPC .......... E05B 81/01; E05B 81/74; E05B 81/62; E05B 81/58; E05B 47/0001;
(Continued)

(56) References Cited

U.S. PATENT DOCUMENTS 6,234,557 B1 * 5/2001 Bae .......................... 296/97.22
8,616,909 B2 * 12/2013 Kurumizawa et al. ....... 439/304
(Continued)

FOREIGN PATENT DOCUMENTS

JP    62-152922    7/1987
JP    7-8045       2/1995
(Continued)

OTHER PUBLICATIONS

International Search Report mailed Jan. 14, 2014, in corresponding International Application No. PCT/JP2013/082956.
(Continued)

*Primary Examiner* — Jerry Redman
(74) *Attorney, Agent, or Firm* — Staas & Halsey LLP

(57) ABSTRACT

An opening and closing control device of a vehicle cover is configured to control opening and closing of a cover covering a connection part of a vehicle connecting a connection member, and includes a drive unit which performs the opening and closing operation by moving the cover. An operation status detection unit an operation position of the cover, a control unit drives and controls the drive unit so that the cover is set in one of a plurality of positions based on whether the connection member is connected or not, the operation position detected by the operation status detection unit, and the ON/OFF state of the power of the vehicle when a control signal is input from a control switch or a remote key.

7 Claims, 11 Drawing Sheets

(51) Int. Cl.
*H02J 7/00* (2006.01)
*B60L 3/00* (2006.01)
*B60L 11/18* (2006.01)
*E05F 15/60* (2015.01)
*E05F 15/77* (2015.01)
*E05F 15/79* (2015.01)
*E05B 47/00* (2006.01)
*E05B 81/58* (2014.01)
*E05B 81/62* (2014.01)
*E05B 81/74* (2014.01)

(52) U.S. Cl.
CPC .......... *E05B 47/0001* (2013.01); *E05B 81/58* (2013.01); *E05B 81/62* (2013.01); *E05B 81/74* (2013.01); *E05F 15/60* (2015.01); *E05F 15/77* (2015.01); *E05F 15/79* (2015.01); *H02J 7/00* (2013.01); *B60L 2240/80* (2013.01); *B60L 2250/10* (2013.01); *B60L 2250/16* (2013.01); *B60L 2270/32* (2013.01); *B60L 2270/34* (2013.01); *E05B 2047/0072* (2013.01); *E05B 2047/0084* (2013.01); *Y02T 10/7005* (2013.01); *Y02T 10/7072* (2013.01); *Y02T 90/14* (2013.01)

(58) Field of Classification Search
CPC .. E05B 2047/0084; E05F 15/79; E05F 15/60; E05F 15/77
USPC ........................... 49/339, 340; 296/56, 97.22
See application file for complete search history.

(56) References Cited

U.S. PATENT DOCUMENTS

| | | | |
|---|---|---|---|
| 9,039,437 B2* | 5/2015 | Kurumizawa | 439/352 |
| 9,199,551 B2* | 12/2015 | Kahara et al. | |
| 2009/0079225 A1* | 3/2009 | Katou | 296/97.22 |
| 2009/0082916 A1* | 3/2009 | Tanaka | 701/22 |
| 2009/0242291 A1* | 10/2009 | Sagawa et al. | 180/65.265 |
| 2010/0133024 A1* | 6/2010 | Miwa et al. | 180/65.21 |
| 2010/0204859 A1* | 8/2010 | Kamaga | 701/22 |
| 2010/0204865 A1* | 8/2010 | Nakamura | 701/22 |
| 2010/0271192 A1* | 10/2010 | Mituta | 340/455 |
| 2011/0022256 A1* | 1/2011 | Asada et al. | 701/22 |
| 2011/0178663 A1* | 7/2011 | Crombez | 701/22 |
| 2012/0007554 A1* | 1/2012 | Kanamori et al. | 320/109 |
| 2012/0049565 A1* | 3/2012 | Saito | 296/97.22 |
| 2012/0065839 A1* | 3/2012 | Makino et al. | 701/36 |
| 2012/0206099 A1* | 8/2012 | Ichikawa et al. | 320/109 |
| 2012/0238122 A1* | 9/2012 | Hirashita et al. | 439/304 |
| 2012/0319648 A1* | 12/2012 | Ohtomo | 320/109 |
| 2013/0015951 A1* | 1/2013 | Kuramochi et al. | 340/5.64 |
| 2013/0047687 A1* | 2/2013 | Kurumizawa et al. | 70/490 |
| 2013/0076059 A1* | 3/2013 | Zalan et al. | 296/97.22 |
| 2013/0110340 A1* | 5/2013 | Park et al. | 701/22 |
| 2013/0158744 A1* | 6/2013 | Inoue et al. | 701/2 |
| 2013/0173102 A1* | 7/2013 | Aldighieri et al. | 701/22 |
| 2013/0218402 A1* | 8/2013 | Hoshihara et al. | 701/32.3 |
| 2013/0249234 A1* | 9/2013 | Higgins | 296/97.22 |
| 2013/0255333 A1* | 10/2013 | Kurumizawa et al. | 70/237 |
| 2013/0257089 A1* | 10/2013 | Minock | 296/97.22 |
| 2013/0260597 A1* | 10/2013 | Kurumizawa et al. | 439/347 |
| 2013/0271076 A1* | 10/2013 | Gregg et al. | 320/109 |
| 2014/0084620 A1* | 3/2014 | Frommann et al. | 296/97.22 |
| 2014/0152255 A1* | 6/2014 | Lovett et al. | 320/109 |
| 2014/0306816 A1* | 10/2014 | Nakamura | 340/457 |
| 2015/0048644 A1* | 2/2015 | Georgi et al. | 296/97.22 |
| 2015/0061314 A1* | 3/2015 | Beck | 296/97.22 |
| 2015/0066257 A1* | 3/2015 | Ochocinski et al. | 701/22 |
| 2015/0183316 A1* | 7/2015 | Wakamatsu et al. | |
| 2015/0224872 A1* | 8/2015 | Frommann et al. | |

FOREIGN PATENT DOCUMENTS

| | | |
|---|---|---|
| JP | 11-318004 | 11/1999 |
| JP | 2007-240535 | 9/2007 |
| JP | 2012-34543 | 2/2012 |
| JP | 2012-76599 | 4/2012 |
| JP | 2013-90341 | 5/2013 |

OTHER PUBLICATIONS

Japanese Office Action mailed Feb. 9, 2016 in related Japanese Application No. 2013-103411.

* cited by examiner

COMPLETELY CLOSED POSITION
(INITIAL POSITION)

CHARGING GUN POSITION
(RESTRICTED POSITION)

FULL OPEN POSITION
(OPERATION POSITION)

VEHICLE COVER OPENING AND CLOSING CONTROL DEVICE

CROSS-REFERENCE TO RELATED APPLICATIONS

This application is a U.S. National Stage Application, which claims the benefit under 35 U.S.C. §371 of PCT International Patent Application No. PCT/JP2013/082956, filed Dec. 9, 2013, which claims the foreign priority benefit under 35 U.S.C. §119 of Japanese Patent Application No. 2013-103411, filed May 15, 2013, the contents of which are incorporated herein by reference.

TECHNICAL FIELD

The present invention relates to a vehicle cover opening and closing control device for opening and closing a cover member installed in a vehicle.

BACKGROUND ART

Heretofore, a vehicle using a motor as a power source has been developed, and a battery for driving the motor is installed in the vehicle. Since it is necessary to charge the battery every time when the remaining amount of the battery decreased, a connection unit for connecting the battery to charging equipment is installed in the vehicle. In the vehicle, an openable/closable cover member covering the connection unit is installed, and the cover member is set at closed position such that the connection unit is covered by the cover member when the charging is not performed. The charging of the battery is performed by exclusive charging equipment at home parking place of the vehicle or at a stand for charging, and the vehicle is sometimes left in a state where the charging equipment is connected. However, long time leaving causes theft of the charging equipment or mischief.

Therefore, a countermeasure for preventing theft of the charging equipment is necessary. As the countermeasure, for example, it is described in Japanese Patent Laid-Open No. 2012-076599 that a cover of a charging port is mounted on a lid in a state where opening portion of the charging port of a vehicle is opened and the lid is closed with the cover for the charging port such that the opening portion is closed and mischief in the inner part is prevented during long time charging. It is described in Japanese Patent Laid-Open No. 11-318004 that a charging lid for closing paddle insertion portion is configured to be automatically opened and closed by an actuator, and a controller installed in a vehicle makes the paddle to be near the charging port such that the charging lid opens when a transmission is at parking position and an ignition switch is turned off.

SUMMARY OF THE INVENTION

Problems to Be Solved by the Invention

The present invention relates to a vehicle cover opening and closing control device for opening and closing a cover member installed in a vehicle.

Since the cover for the charging port covers the charging gun of the charging equipment attached to a charging inlet on vehicle side such that the charging gun is not exposed to outside in Japanese Patent Laid-Open No. 2012-076599, mischief to the charging gun can be prevented. However, complicated work is required for attaching the cover. Complicated work is required in Japanese Patent Laid-Open No. 11-318004, since the charging lid can be opened and closed only when plural conditions of the transmission, the ignition switch and the like are set. Therefore, trouble such as forgetting closing the charging lid and the like may occur.

Therefore, the present invention provides a vehicle cover opening and closing control device enabling secure opening and closing of a cover member of the vehicle with simple operation.

Means for Solving the Problems

The vehicle cover opening and closing control device according to the present invention is the control device for controlling opening and closing of a vehicle cover, configured to control opening and closing of a cover member covering a connection part of a vehicle connecting a connection member, including a drive unit configured to perform opening and closing operation by moving the cover member, an operation status detection unit configured to detect operation position of the cover member, a control unit configured to drive and control the drive unit in such a manner that the cover member is set at any one of a plurality of a predetermined position based on whether the connection member is connected or not, the operation position detected by the operation status detection unit, and the ON/OFF state of the vehicle power when predetermined signal is input from an operation unit.

Effects of the Invention

The present invention, with the above configuration, enables secure opening and closing of the cover member of the vehicle with simple operation, and improving safety by preventing forgetting closing of the cover member and the like.

MODES FOR CARRYING OUT THE INVENTION

Detailed description of embodiments of the present invention will be given below. Though in the embodiments to be described below, which are preferable specific examples for implementing the present invention, various kinds of technical configuration are specified, the present invention is not limited to these configurations unless it is clearly described that the present invention is limited.

Figure 1:
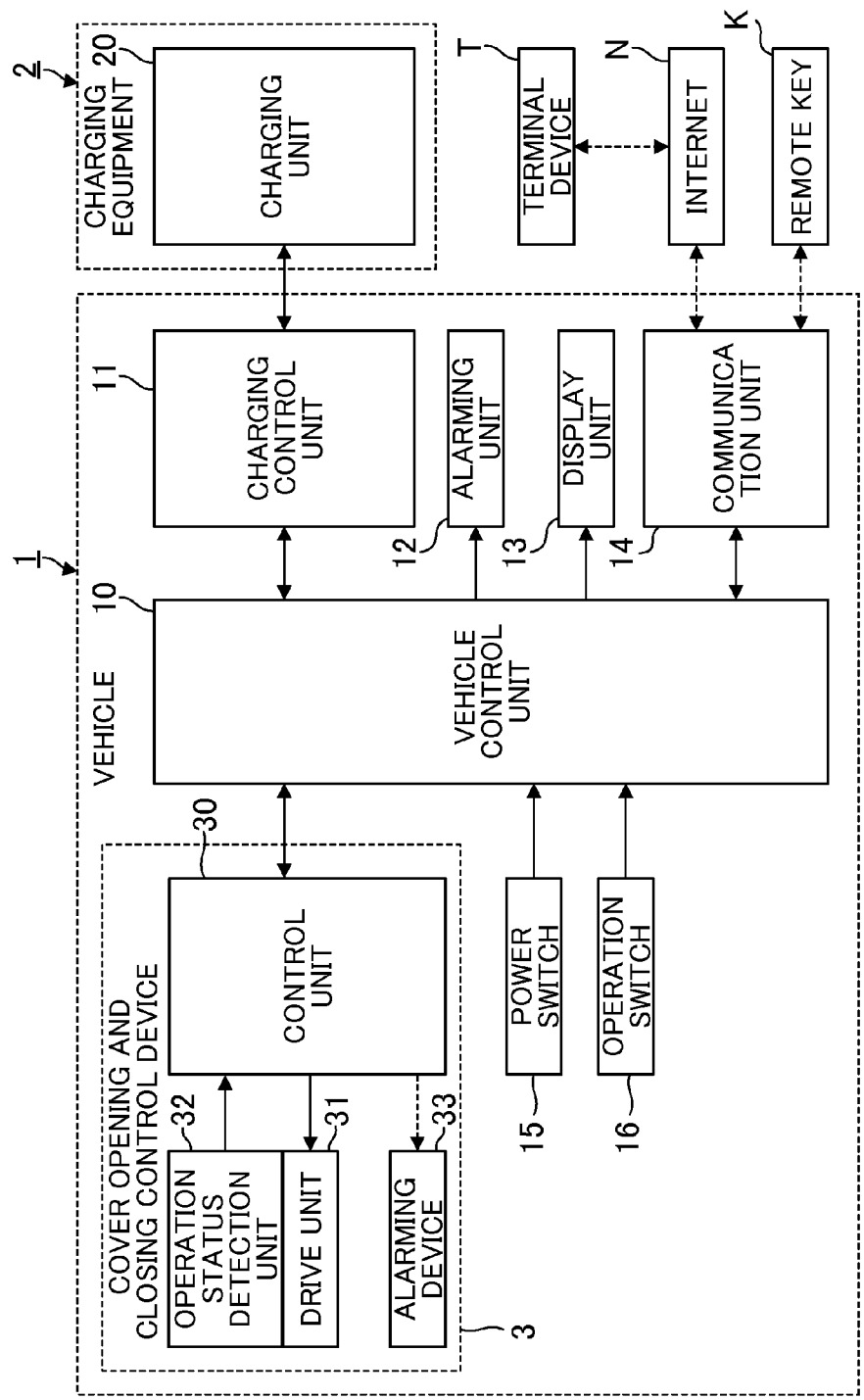
FIG. 1 is a schematic block diagram of a vehicle equipped with a vehicle cover opening and closing device according to an embodiment in the present invention.

FIG. 1 is a schematic block diagram of a vehicle equipped with a vehicle cover opening and closing device and charging equipment according to an embodiment in the present invention. In the example, a vehicle 1 which uses a motor (not shown in the figure) as a power source is charged by charging equipment 2 to supply moving energy, and a cover opening and closing control device 3 is installed in the vehicle 1 side. The vehicle 1 includes a vehicle control unit 10 for controlling motion of entire vehicle 1, a charging control unit 11 for controlling charging of a battery (not shown in the figure) installed in the vehicle, an alarming unit 12 for alarming when abnormality occurs in the vehicle 1, a display unit 13 for displaying various data including motion of the vehicle 1 and the like to the user, and a communication unit 14 for sending and receiving data between a terminal device T such as a mobile phone and a laptop computer via external internet N. The communication unit 14 sends and receives data between a remote key K which performs locking of door, charging operation, and the like, by remote control, and enables various remote control. On the vehicle 1 side, a power switch 15 for turning on and off the power source of the vehicle, and an operation switch 16 for inputting data by manipulation of the user for charging operation and the like.

The charging equipment 2 includes a charging gun 200 to be connected to a connection unit such as an inlet on the vehicle 1 side, and a connection member such as a cable, and can set in a state where a charging unit 20 of the charging equipment 2 is connected to the charging control unit 11 of the vehicle 1.

The cover opening and closing control device 3 includes a control unit 30 for detecting charging operation state, a drive unit 31 for opening and closing a cover member which covers the connecting portion at charging operation, an operation status detection unit 32 for detecting operation state of the cover member, and an alarming device 33 for alarming when abnormality occurs in charging operation. It should be noted that the alarming unit 12 can also work as the alarming device 33. The cover member for covering connection part includes one piece of cover member and a cover member which can be divided to plural cover members.

As the operation status detection unit 32 for detecting operation state of the cover member, for example when the operation position of the cover member is detected, a position detection sensor, a distance measurement sensor, or a magnetic sensor may be used. Alternatively, driving state of the drive unit 31 for driving the cover member may be detected for indirectly detecting operation state of the cover member. For detecting that the cover member is set in restricted position contacting a connection member of the charging gun and the like as described later, a touch sensor for detecting contact, or a sensor for detecting change of load in the drive unit 31 may be used as the operation status detection unit 32. As the sensor for detecting change of load, for example when a motor is used in the drive unit 31, a sensor for detecting rotation of the motor may be used for detecting status of load based on change of detection signal corresponding to change of rotation, or an acceleration sensor for detecting change of rotation may be used.

The vehicle control unit 10 receives necessary information between the charging control unit 11 and the control unit 30. For example, the charging control unit 11 sends whether the connecting member of the charging gun or the like is connected or not, type of the connecting member (for rapid charging or for normal charging), status of progress of charging, and the like, to the vehicle control unit 10. The control unit 30 detects operation state such as the operation position of the cover member, operation velocity, and change of operation load based on the detection signal from the operation status detection unit 32, and sends the detected operation state to the vehicle control unit 10. The vehicle control unit 10 checks if specified condition for travelling is satisfied when the power switch 15 is manipulated and the power of the vehicle is turned on, and sets the vehicle in the travelable state when the condition for travelling is satisfied. A flag corresponding to a state in which condition for travelling is satisfied may be set one by one, and it is determined that the vehicle is in travelable state when all flags corresponding to the condition for travelling are set, for setting the vehicle in the travelable state. Setting processing of the flag corresponding to the condition for travelling may be configured to be executed in the vehicle 1 or the control unit 30 corresponding to the condition for travelling. Then, the vehicle control unit 10 determines whether all flags corresponding to the condition for travelling are set, and sets the vehicle in the travelable state.

The vehicle control unit 10 and the control unit 30 cooperates to execute operation control of the cover member based on the operation position of the cover member, whether the connecting member of the charging gun and the like exists or not, and the status of the power source of the vehicle 1, when an operation signal is input from the remote key K or the operation switch 16. The operation position of the cover member is set, for example, at a full open position for enabling connection in an open state in which a connecting portion is exposed, a restricted position for restricting the connecting member in a connection state so the connecting member is not released from the connection state, or a completely closed position in which the connecting portion is covered in a closed state. One of the conditions for traveling of the vehicle is set to be that the cover member is set at the completely closed position, and the setting securely prevents the vehicle from traveling while the cover member is not closed. The control unit 30 drives the drive unit 31 and sets the cover member at the restricted position for restricting the cover member from releasing the connecting member from the connection state when the vehicle control unit 10 sends a signal indicating the connecting member of the charging gun or the like is in a connection state. The control unit 30 detects a change of operation load of the drive unit 31 based on a detection signal from the operation status detection unit 32, determines that the cover member contacts the connecting member and controls driving of the drive unit 31 to stop. For example, when a motor is used in the drive unit 31, a sensor for detecting rotation state of the motor is attached as the operation status detection unit 32 for detecting rotation state of the motor to detect change of load of the motor. The load of rotation of the motor increases since the cover member does not move though the cover member is driven, when the cover member contacts the connecting member. Therefore, by detecting the change of load of the motor using drive current of the motor or the like, it is determined that the cover member contacts the connecting member when the load of rotation increases.

There is a case where the cover member contacts foreign substance other than the connecting member. Therefore, detection range, which corresponds to the restricted position where the cover member contacts the connecting member generating change of load is set, and it is determined that the cover member contacts the connecting member and is set in the restricted position when the change of load occurs in the detection range, while it is determined that the cover member contacts the foreign substance other than the connecting member when the change of load occurs out of the detection range to control to stop movement of the cover member or decrease drive torque of the drive unit.

In addition to that, the cover member may be configured to leave from the foreign subject by controlling the cover member to reverse in a direction leaving from the restricted position. Safety may be improved, for example, by making the cover member reverse when a finger of the user is pinched by the cover member. Furthermore, the cover member may be controlled to move in a direction leaving from the restricted position to be set in the full open position or completely closed position when the connecting member is not detected while the cover member is moving the detection range of the connection member.

The control unit 30 determines that the cover member is unexpectedly moved from the restricted position when the operation status detection unit 32 detects motion of the drive unit 31 in a state where the cover member is set in the restricted position, and the control unit 30 sends the determination result to the vehicle control unit 10 and inform the user of occurrence of abnormal state using the display unit 13. In this case, the control unit 30 may inform of abnormal state using the alarming device 33. For example, in a case where the cover member is set at the restricted position, the motor is forced to rotate with movement of the cover member when the connecting member of the charging gun or the like is tried to be removed by moving the cover member from the restricted position. Therefore, if a sensor for detecting rotation state of the motor as the operation status detection unit 32 is attached, unexpected movement of the cover member can be detected and alarming (headlight flashing, sounding car horn, and the like) and notification (notification to the terminal device T through the internet N and the like) can be issued when theft or mischief on the connecting member of the charging gun or the like is detected.

Figure 2:
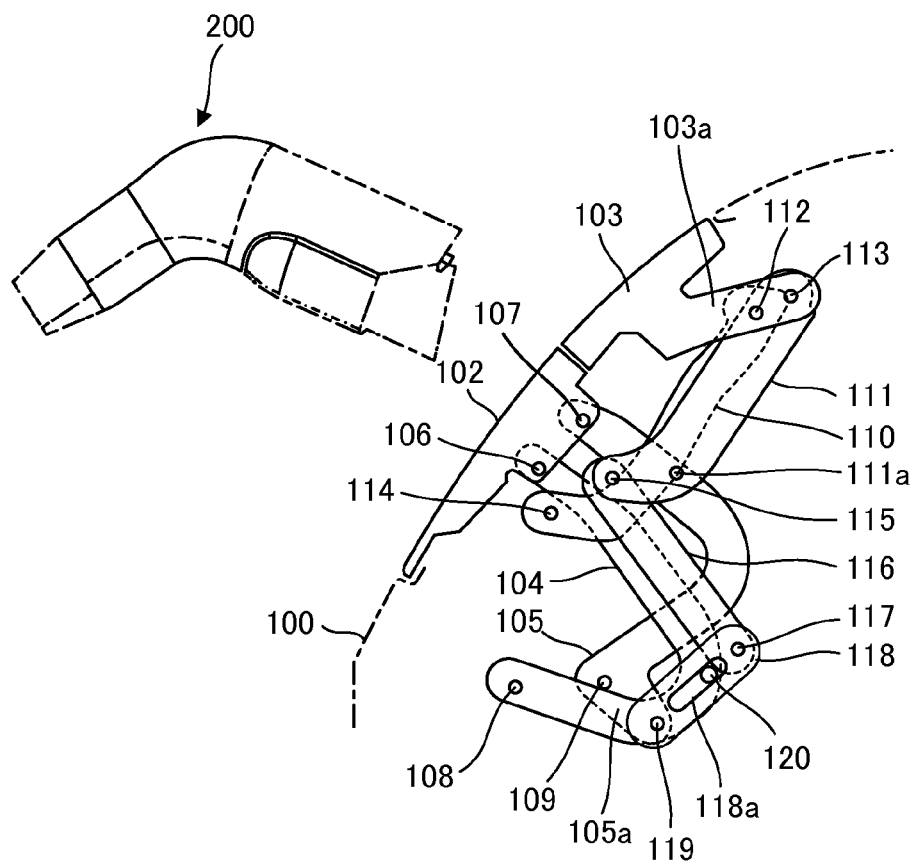
FIG. 2 is a diagram illustrating an example of charging operation by charging equipment.
Figure 3:
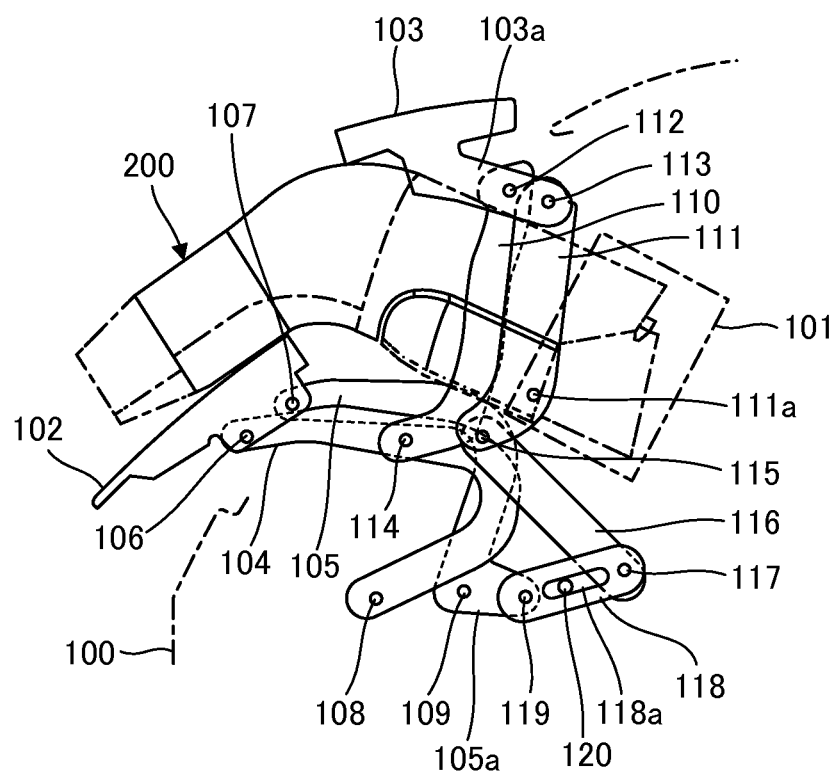
FIG. 3 is a diagram illustrating an example of charging operation by charging equipment.
Figure 4:
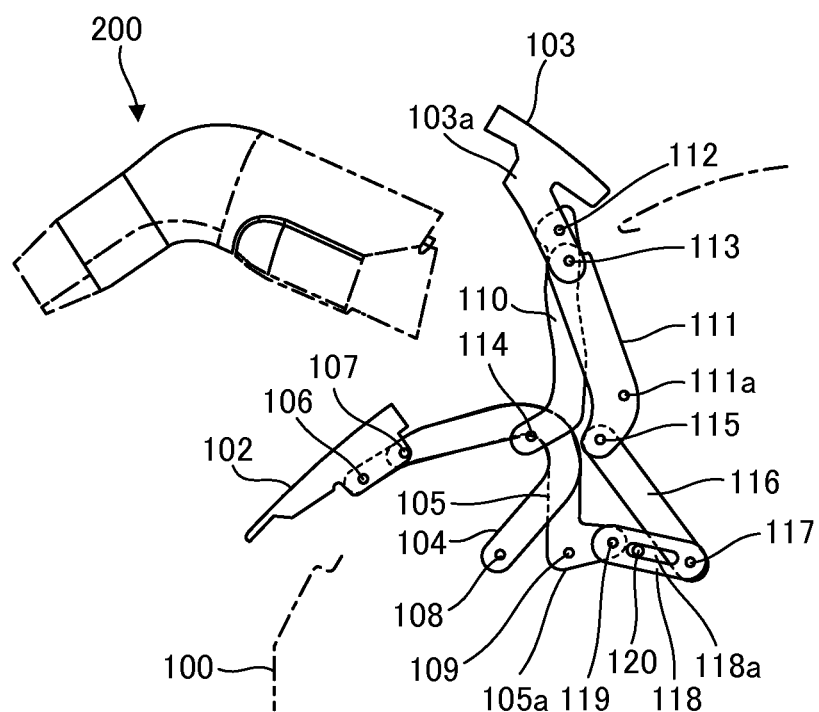
FIG. 4 is a diagram illustrating an example of charging operation by charging equipment.

FIGS. 2 to 4 are diagrams illustrating an example of charging operation by charging equipment. In the example, an inlet 101, which works as a connection unit, is installed in the front part of the vehicle 1 (refer to FIG. 3). In addition to that, cover members 102, 103 for covering the connection unit where the inlet 101 is disposed. FIG. 2 shows initial state in which the cover members 102, 103 closes covering the connection unit, and the cover members 102, 103, which works as motion members, are set at the completely closed position. In FIG. 3, the charging gun 200, which is the connecting member of the charging equipment 2, is connected to the inlet 101, which is the connection unit, and the cover members 102, 103 are set in the restricted position contacting and pinching the charging gun 200. Since the charging gun 200 is pinched by the cover members 102, 103, the charging gun 200 is caught by the cover members 102, 103 when the charging gun 200 is tried to be removed, and removal of the charging gun 200 for theft or mischief can be prevented. In FIG. 4, the cover member 102 moves sliding forward and obliquely downward and the cover member 103 moves rotationally moving upward to open state, to be set at the full open position. Since the cover members 102, 103 move to open state leaving from the connection unit, insertion and removal operation of the charging gun 200 can be easily performed.

At the back surface of the cover member 102 on the lower side, one ends of link members 104, 105 are rotationally movably supported by rotation shafts 106 and 107, respectively. The link member 104 is formed in approximately U shape, and the other end of the link member 104 which is bent forward is rotationally movably supported by a rotation shaft (a fixed shaft) at the front part of the vehicle. The link member 105 is formed in approximately U shape as the link member 104, the end part of the link member which is bent forward is rotationally movably supported by a rotation shaft 109 (a fixed shaft), and the end part is extended backward as a moving part 105a. Both the rotation shafts 106 and 108 on both ends of the link member 104 are configured to be at front side of the rotation shafts 107 and 109 on both ends of the link member 105. Therefore, when the moving part 105a rotationally is moved upward around the rotation shaft 109, one end of the link member 105 rotationally moves forward while one end of the link member 104 also rotationally moves forward such that the cover member 102 moves sliding and obliquely downward toward the forward.

On the back surface of the cover member 103 on the upper side, a supporting part 103a is projected, and one ends of link members 110, 111 are rotationally movably supported by rotation shafts 112 and 113, respectively. In addition to that, the other end of the link member is rotationally movably supported by a rotation shaft 114 (a fixed shaft) on forward side. The link member 111 is supported by a rotation shaft 111a (a fixed shaft) below, and the other end is rotationally movably connected to an end of a connecting member 116 through a rotation shaft 115. The other end of the connecting member 116 is rotationally movably connected to an end of a moving member 118 through a rotation shaft 117. In the completely closed position of the cover member 103 shown in FIG. 2, the link member 111 and the connecting member 116 are set in V shape and the cover member 103 is closed. The other end of the moving member 118 is rotationally movably connected to the tip of the moving member 105a through a rotation shaft 119, and an oblong hole 118a is provided on the center part. A swinging shaft 120 (a fixed shaft) installed at the front part of the vehicle is inserted into the oblong hole 118a, and the moving member 118 is swingably attached to the swinging shaft 120.

When the moving part 105a of the link member 105 is rotationally moved upward around the rotation shaft 109, the moving member 118 swings rotationally moving clockwise around the swinging shaft 120 and one end of the moving member 118 moves downward. Therefore, the connecting member 116 connected to the end of the moving member 118 is drawn to move downward, causing the downward movement of the other end of the link member 111. At this time, the link member 111 swings to be aligned in a line with the connecting member 116, and an end of the link member 111 moves downward. When one end of the link member 111 moves downward, the link member 110 rotationally moves counterclockwise around the rotation shaft to make the cover member 103 move upward. Since, the link member 113 is provided toward top side from the link member 112 in the supporting part 103a, when the link member 110 and the link member 111 rotationally moves counterclockwise interlocking with each other, the link member 111 works such that the link member 113 is moved downward around the link member 112. Therefore, the cover member 103 rotationally moves clockwise moving upward to be opened as shown in FIG. 4.

As described above, by rotationally moving the moving part 105a of the link member 105 by a drive unit such as a motor (not shown in the figure), the cover member 102 can move sliding forward and backward and the cover member 103 can rotationally move moving upward and downward.

The restricted position may be set according to type of the charging gun based on the detection signal from the operation status detection unit 32. For example, the restricted position can be easily set for various types of charging guns when the charging gun, which is inserted to the connection unit, contacts the cover member and the detection signal corresponding to the set position is stored as operation information of the restricted position. In addition to that, since operation information of the restricted position by the detection signal can be set in detail corresponding to the charging gun, narrow detection range of the detection signal corresponding to the restricted position can be set. Therefore, when change of load of the drive unit is detected outside the detection range corresponding to the restricted position, it can be previously determined that the foreign substance other than the charging gun is pinched, enabling quick and precise control to inform that the cover member should be opened to remove the foreign substance.

Figure 5:
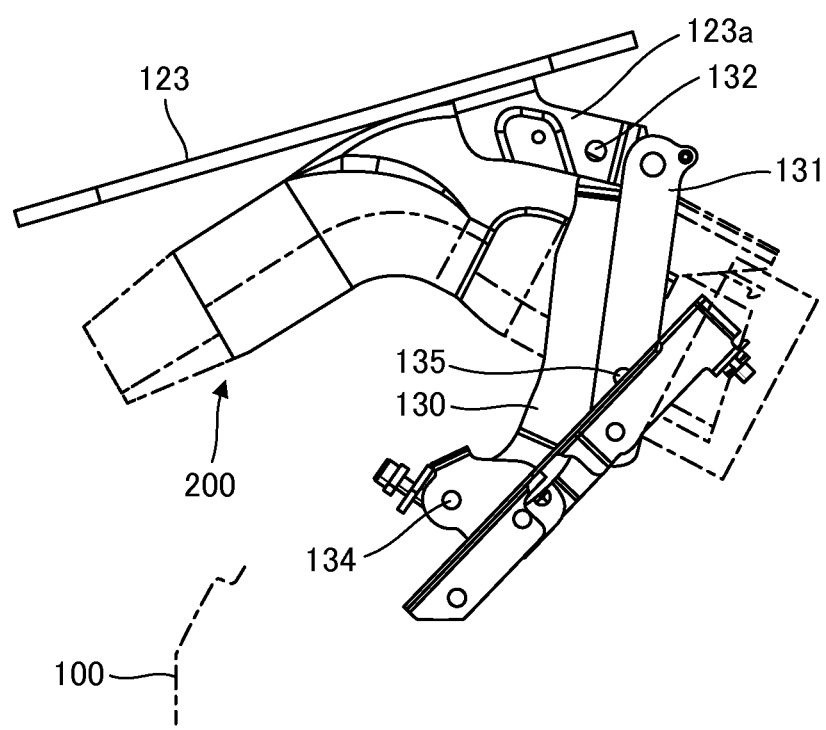
FIG. 5 is a diagram illustrating an example using one cover member.

It should be noted that, though the cover member is moved forward and backward in the example described above, the cover member may be moved horizontally. When the cover member is moved forward and backward or horizontally, the cover may be also moved upward and downward or rotationally, such that the connection part on the vehicle side is opened and closed. The connection unit may be opened and closed by a drive unit not using the divided cover members but using one cover member. For example, FIG. 5 is a diagram illustrating an example the connection unit is opened and closed using one cover member 123. In the example, the cover is configured to cover the connection unit. At the back surface of the cover member 123, a supporting part 123a is projected and the supporting part 123a, and on the supporting part 123a, one ends of link members 130, 131 are rotationally movably supported by rotation shafts 132 and 133, respectively. The other ends of the link member 130 and the link member 131 are rotationally movably supported by rotation shafts 134, 135 of front side 100 of the vehicle 1. The link member 131 is rotationally moved around the rotation shaft by a motor not shown in the figure such that the cover member 123 rotationally moves while moving upward and downward as the link member 130. In FIG. 5, cover member 123 is set at the restricted position in which the cover member 123 contacts the upper side of the charging gun 200, and when the charging gun 200 is tried to be removed, the cover member 123 is contacted by the charging gun 200 such that unexpected removal motion can be prevented.

Charging operation in the example of the device above mentioned will described next. When the charging operation of the vehicle 1 is performed at home, the user stops the vehicle 1 at the parking after returning home. At this stage, the cover members 102, 103, as shown in FIG. 2, are set in the completely closed position and close covering the connection unit. The operation switch 16 or the remote key K is manipulated for connection the charging gun 200, and the operation signal of the charging operation is output. By the operation, the control unit 30 drives the drive unit 31 and the cover members 102, 103 are set in the full open position to make the connection unit is exposed as shown in FIG. 4.

The charging gun 200 is inserted into the exposed connection unit to be set in connection state, and the charging unit 20 of the charging equipment 2 and the charging control unit 11 of on the vehicle 1 side send and receive information necessary for charging to each other, to start charging. When the vehicle control unit 10 commands the control unit 30 of connection of the charging unit 20, the control unit 30 drives and controls the drive unit 31 and set the cover members 102, 103 at the restricted position as shown in FIG. 3. The control unit 30 determines whether the load is changed by contact of the cover members 102, 103 to the charging gun 200 based on detection signal from the operation status detection unit 32, and stop the drive unit 31 when the load is changed. The cover opening and closing control device 3 is set in monitoring mode to determine whether abnormality occurs based on the detection signal from the operation status detection unit 32. When the monitoring mode is set, it is displayed on the display unit 13 that the monitoring mode works. By setting the cover members 102, 103 at the restriction position, the charging gun 200 is pinched by the cover members 102, 103 and the charging gun 200 can not be removed, to prevent theft and mischief.

When the charging is completed, the operation switch 16 or the remote key is manipulated to output operation signal concerning the charging operation, for removing the charging gun 200. By the manipulation, the control unit 30 drives the drive unit 31, and sets the cover members 102, 103 at full open position by opening them, and pinch of the charging gun 200 is released. After the charging gun 200 is removed, the operation switch 16 or the remote key K is manipulated to output the operation signal concerning the charging operation. By the manipulation, the control unit 30 drives the drive unit 31, and sets the cover members 102, 103 at the completely closed position by moving them in a closing direction. Then the power switch 15 is turned on to turn on the power of the vehicle 1, such that the vehicle 1 is set in travelable state. In this case, when the cover members 102, 103 is not set at the completely closed position, since the conditions for traveling is not satisfied, the vehicle 1 is not set in travelable state.

As described above, opening and closing control of the cover members 102, 103 is performed by manipulation only the operation switch 16 or the remote key to set the covers member at the full open position, the restricted position and the completely closed position. Therefore, easy manipulation enables the opening and closing control of the cover member.

Figure 6:
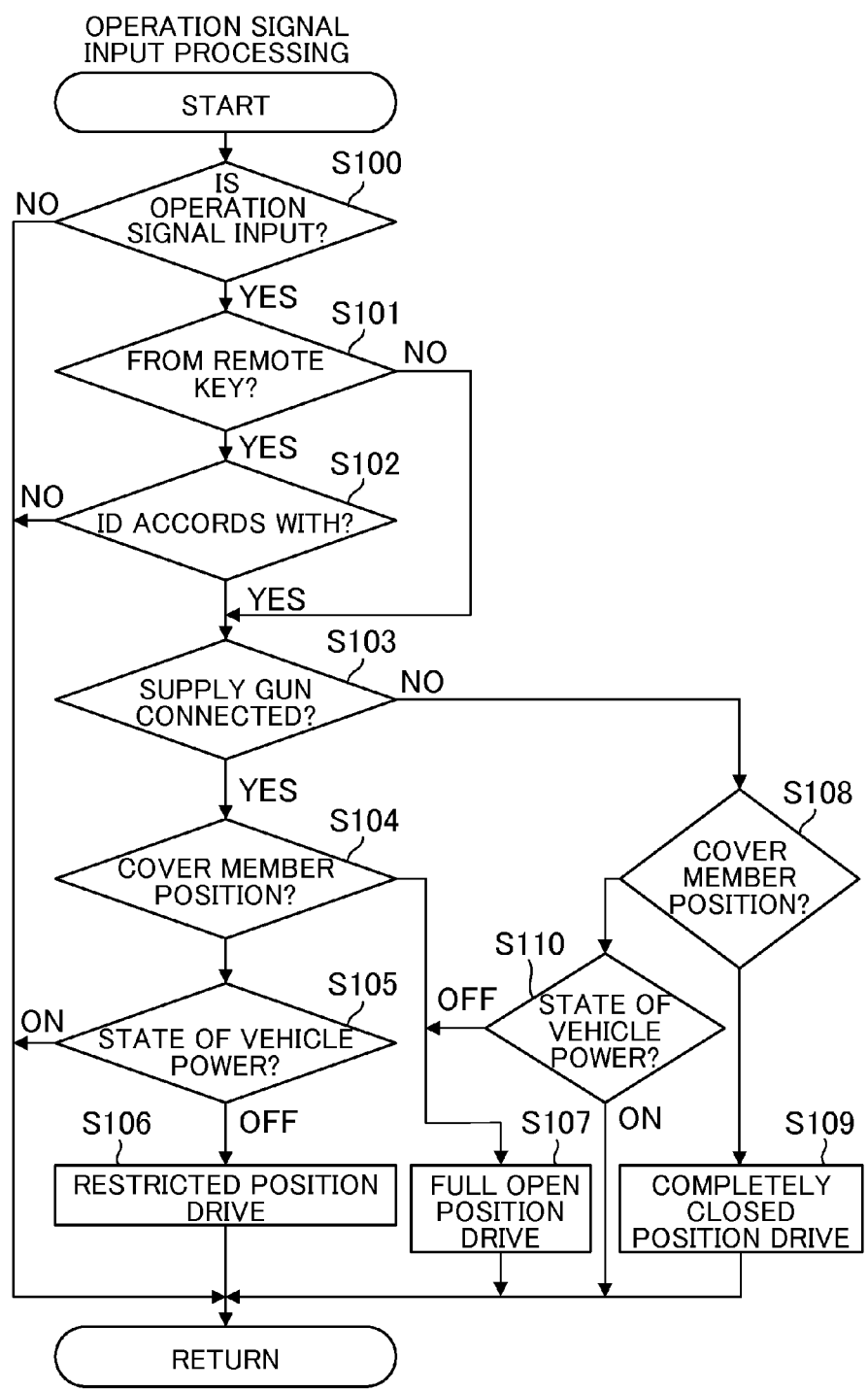
FIG. 6 is a flowchart of processing when operation signal of charging operation is input.

FIG. 6 is a flowchart of processing when operation signal of charging operation is input. The control unit 30 checks if the operation signal of the charging operation is input first (S100), and determines if the operation signal is input from the remote key K (S101) when the operation signal is input (S100; YES). The process ends if the operation signal is not input (S100; NO). When the operation signal is input from the remote key K (S101; YES) in Step S101, authentication process of determining whether the operation signal accords with the ID registered on the vehicle 1 side. When there is no input from the remote key K and there is input from the operation switch 16 on the vehicle 1 side in Step S101 (S101; NO), it is checked whether the charging gun 200 is connected. When the ID accords with in Step S102, the process proceeds to Step S103 to check whether the charging gun 200 is connected. When the ID does not accords in Step S102, the process ends.

When the charging gun 200 is connected (S103; YES), set position of the cover members 102, 103 is checked (S104). When the cover members 102, 103 are set at the full open position shown in FIG. 4, the power state of the vehicle 1 is checked (S105). When the power of the vehicle 1 is turned off, the cover members 102, 103 is driven and controlled to be set at the full open position assuming that the vehicle is in charging operation (S106). When the power of the vehicle 1 is turned on in Step S105, the process ends. At the time, message promoting removing of the charging gun 200 may be displayed on the display unit 13. When the cover members 102, 103 are at the restricted position in Step 104, the cover members 102, 103 are driven and controlled to be set at the full open position assuming that the charging operation ends.

When the charging gun 200 is not connected (S103; NO), set position of the cover members 102, 103 is checked (S108). When the cover members 102, 103 are set at the full open position, it is assumed that the charging gun 200 is removed, and the cover members 102, 103 are driven and controlled to be set at the completely closed position as shown in FIG. 2 (S109). When the cover members 102, 103 are set at the completely closed position, the power state of the vehicle 1 is checked (S110). When the power of the vehicle 1 is turned on, the process ends. When the power of the vehicle 1 is turned off, it is assumed that the charging operation will be started and the process proceeds to Step S107, and the cover members 102, 103 are driven and controlled to be set at the full open position.

As described above, by checking the set position of the cover members 102, 103, whether the charging gun 200 exists or not, and the power state of the vehicle 1, it is possible to securely perform the charging operation by inputting of one kind of operation signal, such that the charging can be performed by simple operation.

Figure 7:
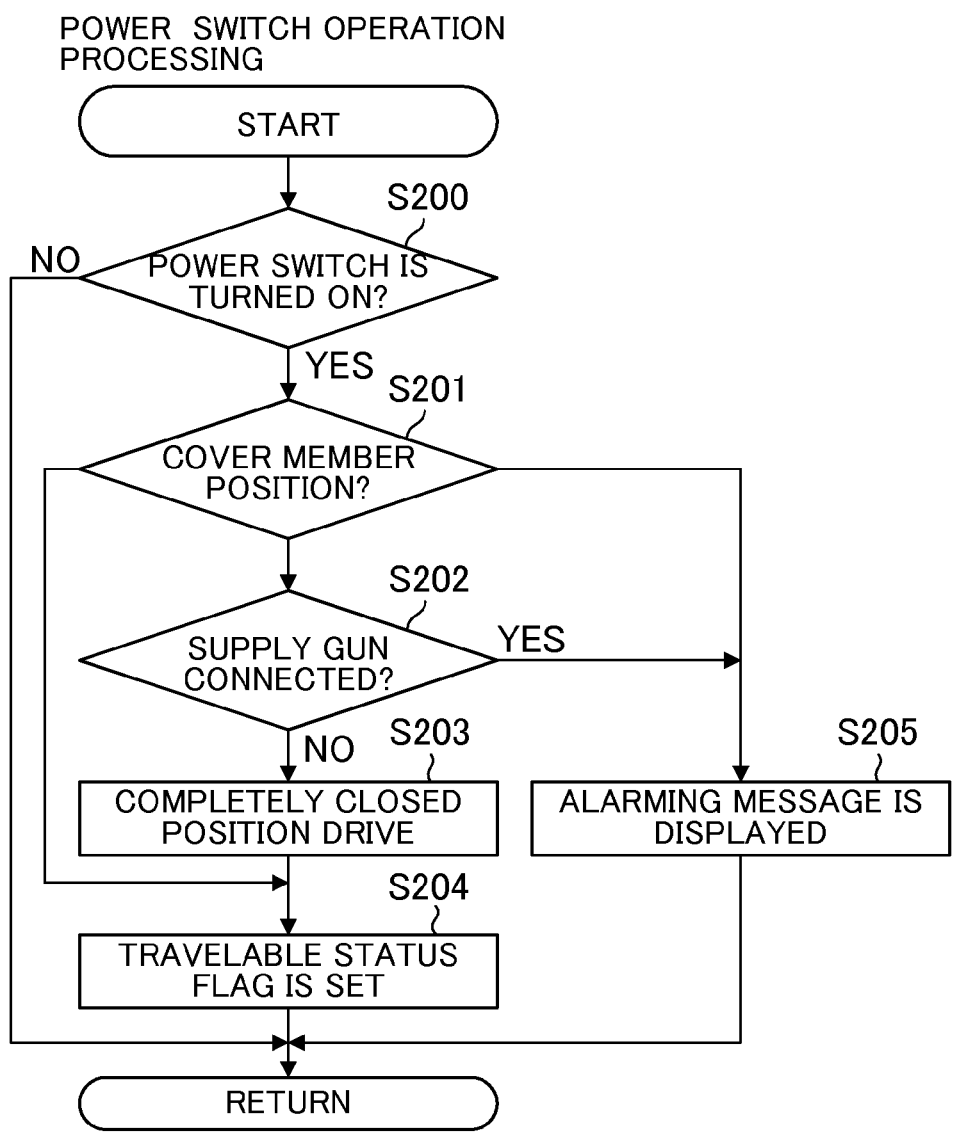
FIG. 7 is a flowchart illustrating processing when power switch is manipulated.

FIG. 7 is a flowchart illustrating processing when power switch is manipulated and the power of the vehicle 1 is turned on. It is checked whether the power switch 15 is input first (S200), and set position of the cover member 102 is determined (S201) when the power switch 15 is input (S200; YES). When the power switch 15 is not input, the process ends. When it is determined that the cover members 102, 103 are set at the full open position in Step S201, it is checked whether the charging gun 200 is connected (S202). When the charging gun 200 is not connected (S202; NO), the cover members 102, 103 are driven and controlled to be set at the completely closed position (S203). After the cover members 102, 103 are set at the completely closed position, a flag of travelable condition corresponding is set (S204). When the charging gun 200 is connected (S202; YES), alarm message promoting removal of the charging gun 200 is displayed (S205). When the cover members 102, 103 are set at the restricted position in Step S201, the process proceeds to Step S204, and a flag concerning the travelable state is set (S204).

By processing as above, if the charging gun 200 is connected when the power switch 15 is manipulated and the power of the vehicle 1 is turned on, the alarm message is displayed and removal of the charging gun 200 is promoted to the user, and the vehicle 1 is never set in the travelable state. When the cover members 102, 103 are opened at the full open position, the cover members 102, 103 are automatically set at the completely closed position and closed, and the vehicle 1 is set in the travelable state. Therefore, traveling with the cover members 102, 103 open is prevented and safety for charging operation can be improved. When the cover members 102, 103 are at the full open position and the charging gun 200 is connected, or when the cover members 102, 103 are set at the restricted position and opened, the vehicle 1 never set in travelable state even if the power of the vehicle 1 is turned on. It should be noted that the cover members 102, 103 are configured not to be set directly from the completely closed position to the restricted position, and the cover members 102, 103 may be configured not to be set from the completely closed position to the full open position when the power or the vehicle 1 is turned on.

Figure 8:
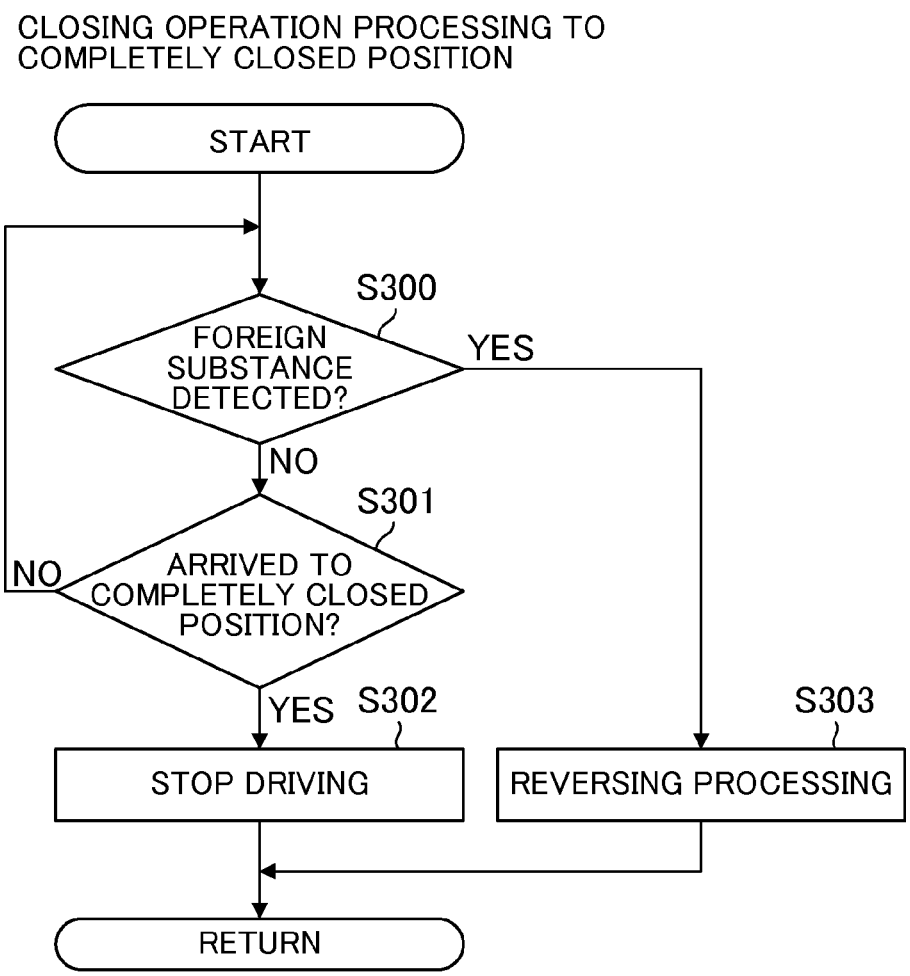
FIG. 8 is a flowchart illustrating processing when a cover member is driven from full open position in closing direction to completely closed position.

FIG. 8 is a flowchart illustrating processing when the cover members 102, 103 are driven from the full open position in closing direction to completely closed position. The cover members 102, 103 are driven and controlled in closing direction while it is checked whether foreign substance are detected (S300). The detection of the foreign substance may be performed, when a motor is used in the drive unit, such that the operation status detection unit 32 detects the rotation state or load state of the motor. It is determined whether the cover members 102, 103 arrives at the completely closed position when the foreign substance is not detected (S300; NO), and driving of the cover members 102, 103 is stopped (S302) when the cover members 102, 103 arrives at the completely closed position. When the cover members 102, 103 does not arrive at the completely closed position (S301; NO), the process returns to Step S300 and detection process of the foreign substance is performed. When the foreign substance is detected (S300; YES), inversion driving of the cover members 102, 103 in opening direction is performed (S303). It should be noted that when the foreign substance is detected, movement of the cover members 102, 103 may be stopped or the cover members 102, 103 may be driven and controlled to decrease driving force for moving the cover member.

By processing as above, when the finger or the like of the user is unexpectedly pinched while the cover members 102, 103 are moved in closing direction, the cover members 102, 103 automatically moves in opening direction to prevent unexpected pinch, and safety at charging operation can be increased.

Figure 9:
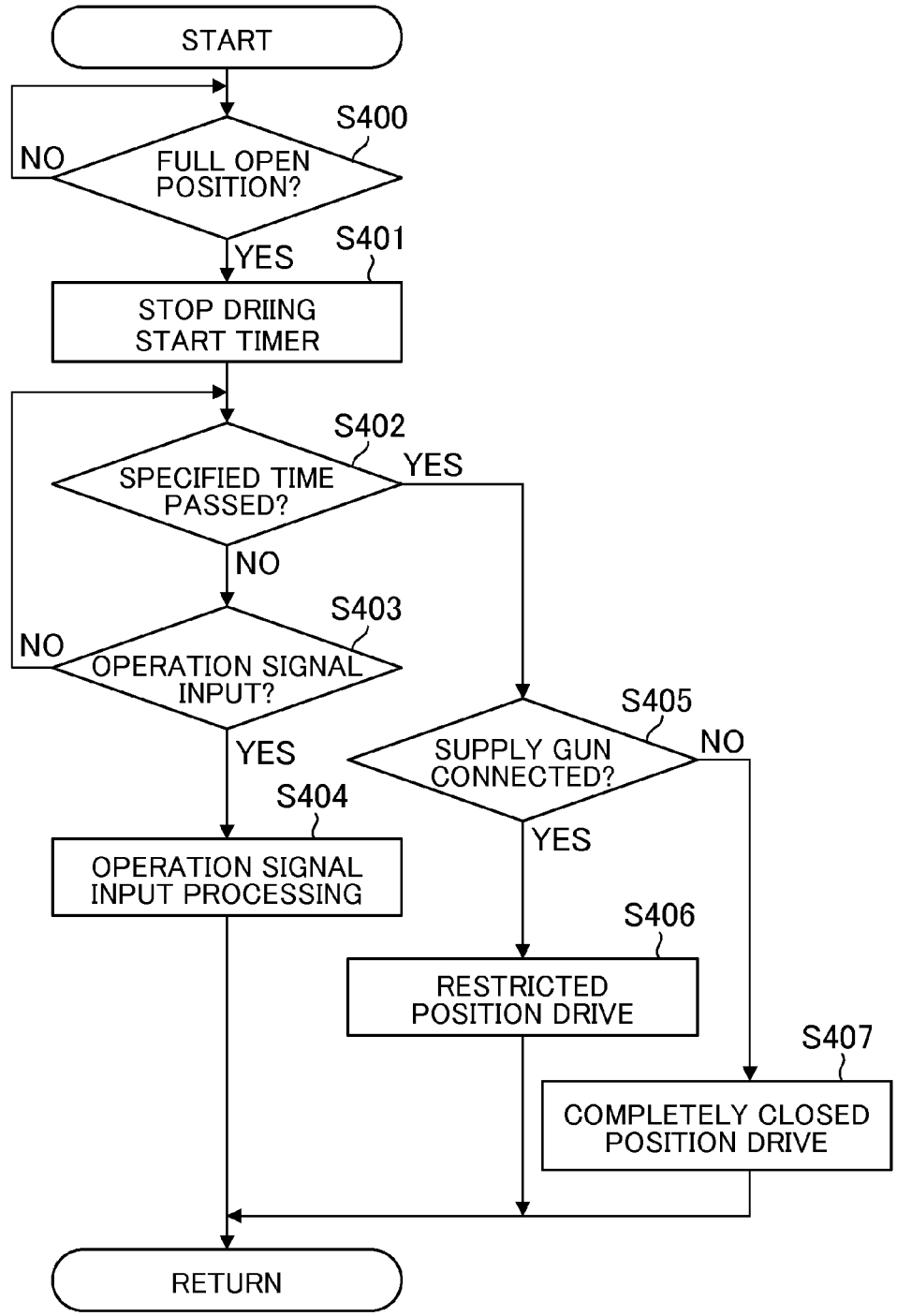
FIG. 9 is a flowchart illustrating processing when a cover member is set at full open position to be in open state.

FIG. 9 is a flowchart illustrating processing when the cover members 102, 103 are set at full open position to be in open state. It is checked whether the cover members 102, 103 are set at the full open position first (S400), and driving of the cover members 102, 103 is stopped and a timer is started for timing (S401) when the cover members 102, 103 are set in the full open position (S400; YES). When the cover members 102, 103 are not set in the full open position (S400; NO), checking in Step S400 is repeated. It is determined if predetermined time lapsed based on timing by the timer, and it is determined whether input of operation signal from the operation switch 16 or the remote key K exists when the predetermined time has not passed (S402; NO). When the input of the operation signal exists (S403; YES), input processing of the operation signal shown in FIG. 6 is performed (S404). When the input of the operation signal does not exist (S403; NO), the process returns to Step S402.

When it is determined that the predetermined time has passed based on the timing by the timer (S402; YES), it is checked if the charging gun 200 is connected (S405; YES), and the cover members 102, 103 are driven and controlled to be set at the restricted position (S406). When the charging gun 200 is not connected (S405; NO), the cover members 102, 103 are driven and controlled to be set at the completely closed position (S407).

By processing as above, when the cover members 102, 103 are set at the full open position and opened, even when the user forgets operation of the operation switch 16 or the remote key K, the cover members 102, 103 can be automatically set at the restricted position of the completely closed position after the predetermined time lapsed. Therefore, it is prevented to be in state where the cover members 102, 103 are kept opened.

Figure 10:
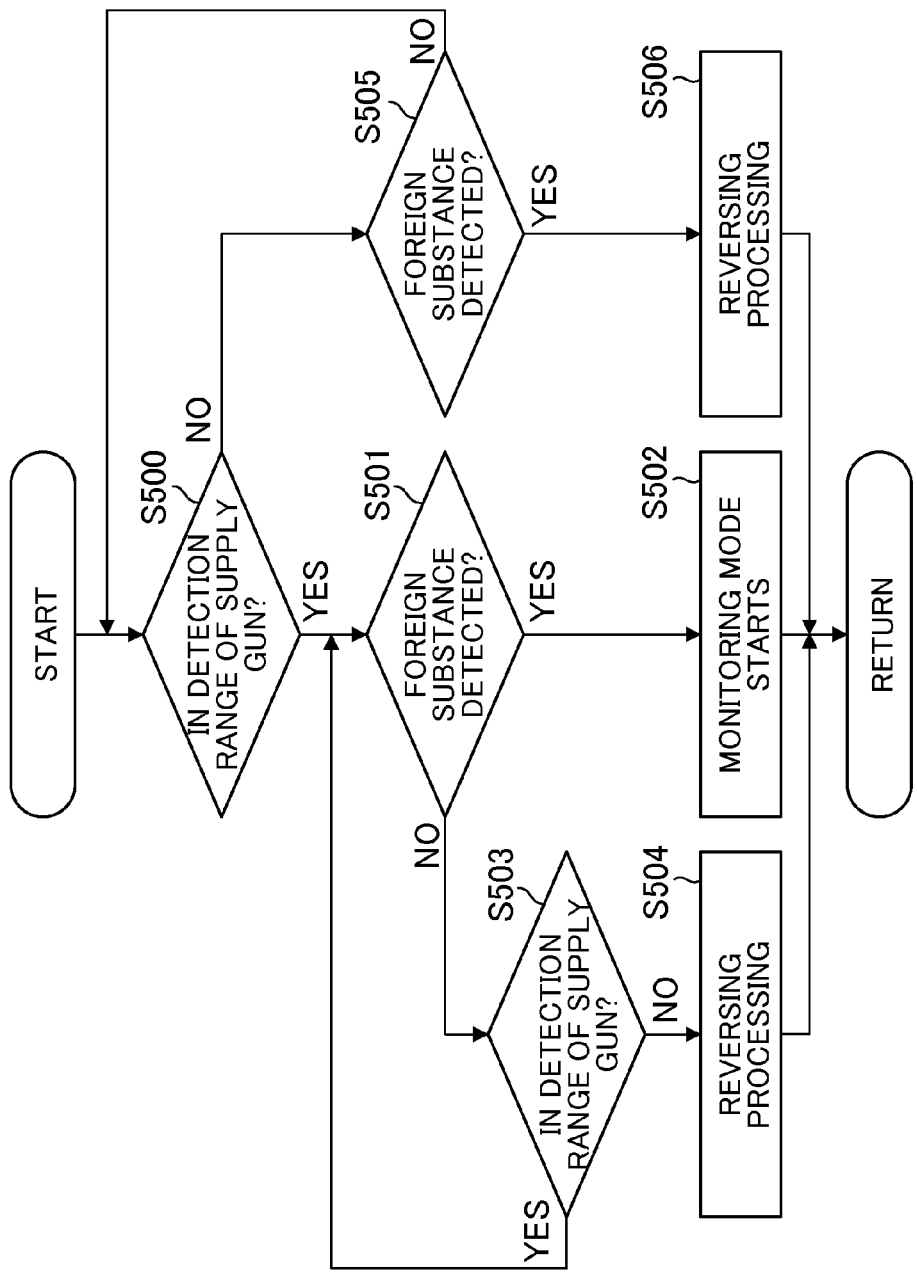
FIG. 10 is a flowchart illustrating processing when a cover member is driven from full open position to restricted position.

FIG. 10 is a flowchart illustrating processing when the cover members 102, 103 are driven and controlled from the full open position to the restricted position. The cover members 102, 103 are driven and controlled in closing direction and it is checked whether the detection signal sent from the operation status detection unit 32 are within detection range of the charging gun 200 first (S500).

Concerning the detection range of the charging gun 200, for example, the restricted position may be set in a state where the cover members 102, 103 actually contact with the charging gun 200, storing the detection signal corresponding to the set position, and specified detection may be set based on the stored detection signal.

plural kinds of detection range, corresponding to the type of the charging gun 200, may be stored and the detection range may be set such that when the charging gun 200 is connected to the connection unit, the type of the charging gun 200 is determined. Alternatively, by manipulating and inputting the type of the charging gun 200 to be used by the user, the detection range is selected from the plural kinds of the detection ranges stored.

When it is within the detection range of the charging gun 200 (S500; YES), whether the foreign substance exists or not is detected (S501). Concerning the detection of the foreign substance, for example, when a motor is used in the drive unit, the detection of the foreign substance may be performed by detecting state of rotation or load the motor by the operation status detection unit 32. When the foreign substance is detected (S501; YES), it is assumed that the cover contacts with the charging gun 200 and arrives at the restricted position, driving of the cover members 102, 103 is stopped and monitoring mode is started (S502). The user may be informed that the monitoring mode is set by informing of setting of monitoring mode using a blinker or a car horn, or informing the terminal device.

When the foreign substance is not detected (S501; NO), it is determined whether it is within the detection range of the charging gun 200 or not (S503). When it is within the detection range of the charging gun 200 (S503; YES), the process returns to Step S501, and detection of existence of the foreign substance is repeated. When it is not within the detection range of the charging gun 200 (S503; NO), it is assumed that the charging gun 200 is not detected in the detection range, and reversing processing of performing reversing driving of the cover members 102, 103 in opening direction (S504). In this case, it may be assumed that the charging gun 200 is not detected while the cover members 102, 103 move in the detection range of the charging gun 200, and the cover members 102, 103 may be driven and controlled to be set at the full open position or the completely closed position.

When it is not within the detection range of the charging gun 200 in Step S500 (S500; NO), existence of the foreign substance is detected (S505). The detection of the foreign substance may be performed as Step S501. When the foreign substance is detected (S505; YES), reversing processing of performing reversing drive of the cover members 102, 103 in opening direction. When the foreign substance is detected, movement of the cover members 102, 103 may be stopped, or the cover members 102, 103 may be driven and controlled to decrease driving force. When the foreign substance is not detected (S505; NO), the process returns to Step S500 and it is determined whether it is within the detection range of the charging gun 200.

By processing as above, when the cover members 102, 103 are set at the restricted position, the cover members 102, 103 are set in a state where the cover members 102, 103 actually contact with and securely pinch the charging gun 200, such that theft and mischief can be securely prevented. Since the detection range of the charging gun 200 is set in advance, when the foreign substance is detected out of the detection range, reverse driving of the cover members 102, 103 is performed in opening direction, assuming that the cover members 102, 103 pinch anything other than the charging gun 200, such that safety is improved. Damaging by contact of the charging gun 200 and the cover members 102, 103 or the like can be prevented by decreasing driving force by the drive unit or decreasing moving speed of the cover members 102, 103, in the detection range of the charging gun 200.

Figure 11:
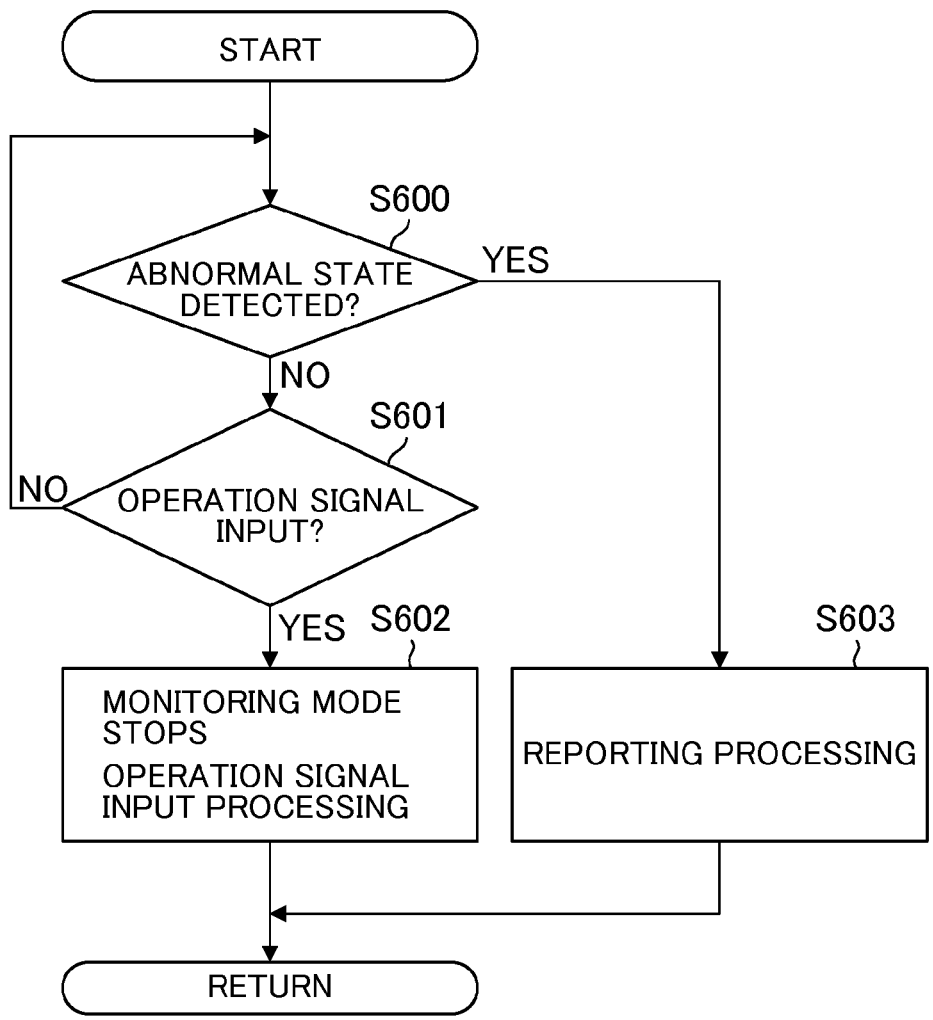
FIG. 11 is a flowchart illustrating processing in monitoring mode.

FIG. 11 is a flowchart illustrating processing in monitoring mode. In the monitoring mode, existence/absence of abnormality state is detected based on detection signal from the operation state detection unit (S600). Concerning the existence/absence of abnormality state, for example, when a motor is used in the drive unit, since, if the charging gun 200 is forced to move in direction of opening the cover members 102, 103 for removing the charging gun 200, the motor is forced to rotate interlocking with the motion, abnormality state can be detected by detecting rotation state.

When abnormality state is not detected (S600; NO), it is checked whether input of operation signal from the operation switch 16 or the remote key K exists (S601). When the input of operation signal exists (S601; YES), monitoring mode is stopped and input processing of the operation signal, as shown in FIG. 6, is performed (S602). When the input of operation signal does not exist (S601: NO), the process returns to Step S600.

When abnormality state is detected (S600; YES), reporting process is performed (S603). In the reporting process, the alarming device 33 performs processing such as issuing alarm including headlight flashing, sounding a car horn, or the like, or sending alarm information to the terminal device T of the user. In addition to that, the detection of the abnormality may be stored as history information, and the history information may be displayed on the display unit 13 while monitoring mode stops, or alarming sound may be output when the charging gun 200 is removed.

When the cover members 102, 103 are forced to move during monitoring mode, the cover members 102, 103 may be driven and controlled to keep at the restricted position or to return to the restricted position.

By processing as above, since it is detected as abnormality state when the cover members 102, 103 are unexpectedly moved, and alarm is output from the vehicle 1 to quickly inform the user, theft and mischief on the charging gun 200 can be securely prevented.

INDUSTRIAL APPLICABILITY

When the cover members 102, 103 are forced to move during monitoring mode, the cover members 102, 103 may be driven and controlled to keep at the restricted position or to return to the restricted position.

The vehicle cover opening and closing control device of the present invention can be applied to a cover member other than the above described cover member covering the connection unit of charging, and convenience is enhanced with simple operation while preventing forgetting closing or the like by securely opening and closing the cover member, such that safety can be improved.

EXPLANATION OF REFERENCE NUMERALS 1 vehicle
2 charging equipment 3 cover opening and closing control device
10 vehicle control unit
11 charging control unit
12 alarming unit
13 display unit
14 communication unit
15 power switch
16 operation switch
20 charging unit
30 control unit
31 drive unit
32 operation status detection unit
33 alarming device

The invention claimed is:

1. A control device for controlling opening and closing of a vehicle cover covering a connection part of a vehicle, which is configured to connect to a connection member, comprising:
  a drive unit configured to move the cover to an open position, a closed position, or a restricted position in which the cover restricts the connection member which is in a connection state, so the connection member is not released from the connection state;
  an operation status detection unit configured to detect a position of the cover;
  a control unit configured to drive and control the drive unit in such a manner that the cover is set at one of the open position, the closed position or the restricted position based on whether the connection member is connected to the connection part, the position detected by the operation status detection unit, and an ON/OFF state of a vehicle power when a predetermined signal is input from a remote key to perform locking a door or charging, or from an operation switch to perform an input for charging.

2. A control device for controlling opening and closing of a vehicle cover according to claim 1, wherein in the open position the cover is opened such that the connection part is exposed and a connection operation is enabled, in the restricted position a connection status of the connection member is restricted so as not to be released, and in the closed position the cover is closed such that the connection part is covered by the cover.

3. A control device for controlling opening and closing of a vehicle cover according to claim 2, wherein the control unit is configured to set the cover at a position other than the open position when the position of the cover is at the open position for a predetermined time.

4. A control device for controlling opening and closing of a vehicle cover according to claim 2, wherein the control unit is configured to set the cover at the closed position when the connection member is not connected and the position of the cover is the open position when the vehicle power is switched on.

5. A control device for controlling opening and closing of a vehicle cover according to claim 1, wherein the control unit is configured to set the cover at a setting position other than the open position when the position of the cover is at the open position for a predetermined time.

6. A control device for controlling opening and closing of a vehicle cover according to claim 1, wherein the control unit is configured to set the cover at the closed position when the connection member is not connected and the position of the cover is the open position when the vehicle power is switched on.

7. A control device for controlling opening and closing of a vehicle cover according to claim 1, wherein the control unit is configured to set the vehicle in a travelable state when the position of the cover is the closed position when the vehicle power is switched on.

* * * * *

UNITED STATES PATENT AND TRADEMARK OFFICE
CERTIFICATE OF CORRECTION

PATENT NO. : 9,580,940 B2  
APPLICATION NO. : 14/891181  
DATED : February 28, 2017  
INVENTOR(S) : Tsuyoshi Kondo et al.

Page 1 of 1

It is certified that error appears in the above-identified patent and that said Letters Patent is hereby corrected as shown below:

On the Title Page

Item [Abstract] (57), Column 2, Line 6:
After "unit", insert -- detects --.

Signed and Sealed this
Second Day of May, 2017

Michelle K. Lee
*Director of the United States Patent and Trademark Office*